(12) United States Patent
Matsumoto et al.

(10) Patent No.: US 7,043,717 B2
(45) Date of Patent: May 9, 2006

(54) DEBUGGING APPARATUS AND METHOD

(75) Inventors: Nobu Matsumoto, Ebina (JP); Takashi Miura, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 579 days.

(21) Appl. No.: 10/208,839

(22) Filed: Aug. 1, 2002

(65) Prior Publication Data

US 2003/0221188 A1   Nov. 27, 2003

(30) Foreign Application Priority Data

May 27, 2002   (JP)   ............................. 2002-152961

(51) Int. Cl.
*G06F 9/44* (2006.01)

(52) U.S. Cl. ................. 717/124; 717/125; 717/129

(58) Field of Classification Search ............... 717/129, 717/124, 125; 714/38
See application file for complete search history.

(56) References Cited

U.S. PATENT DOCUMENTS

| | | | |
|---|---|---|---|
| 6,550,056 B1 * | 4/2003 | Mizumoto et al. | 717/124 |
| 6,708,289 B1 * | 3/2004 | Kudo | 714/28 |
| 6,766,511 B1 * | 7/2004 | Berry et al. | 717/128 |
| 6,836,884 B1 * | 12/2004 | Evans et al. | 717/140 |
| 6,892,325 B1 * | 5/2005 | Bates et al. | 714/38 |
| 2003/0074650 A1 * | 4/2003 | Akgul et al. | 717/129 |

FOREIGN PATENT DOCUMENTS

| | | |
|---|---|---|
| EP | 0 992 906 A2 | 4/2000 |
| JP | 57-108942 | 7/1982 |
| JP | 57-137951 | 8/1982 |
| JP | 58-112149 | 7/1983 |
| JP | 2-300943 | 12/1990 |
| JP | 3-113648 | 5/1991 |
| JP | 4-64139 | 2/1992 |
| JP | 4-145544 | 5/1992 |
| JP | 9-319615 | 12/1997 |
| JP | 2869379 | 12/1998 |
| JP | 2000-250777 | 9/2000 |
| JP | 2001-282572 | 10/2001 |
| JP | 2002-41285 | 2/2002 |
| JP | 2002-41326 | 2/2002 |
| JP | 2002-73370 | 3/2002 |
| KR | 2002-0004346 | 1/2002 |

* cited by examiner

*Primary Examiner*—Wei Y. Zhen
*Assistant Examiner*—Mulubrhan Tecklu
(74) *Attorney, Agent, or Firm*—Oblon, Spivak, McClelland, Maier & Neustadt, P.C.

(57) ABSTRACT

A first storage device stores a plurality of program codes. Each program code has an identifier. A second storage device has at least one storage area, which stores a program code to be executed of the plurality of program codes stored in the first storage device. A first variable storage area holds the identifier of the program code stored in the second storage device. A controller breaks execution of the program code when the contents of a command match those of the first variable storage area.

30 Claims, 7 Drawing Sheets

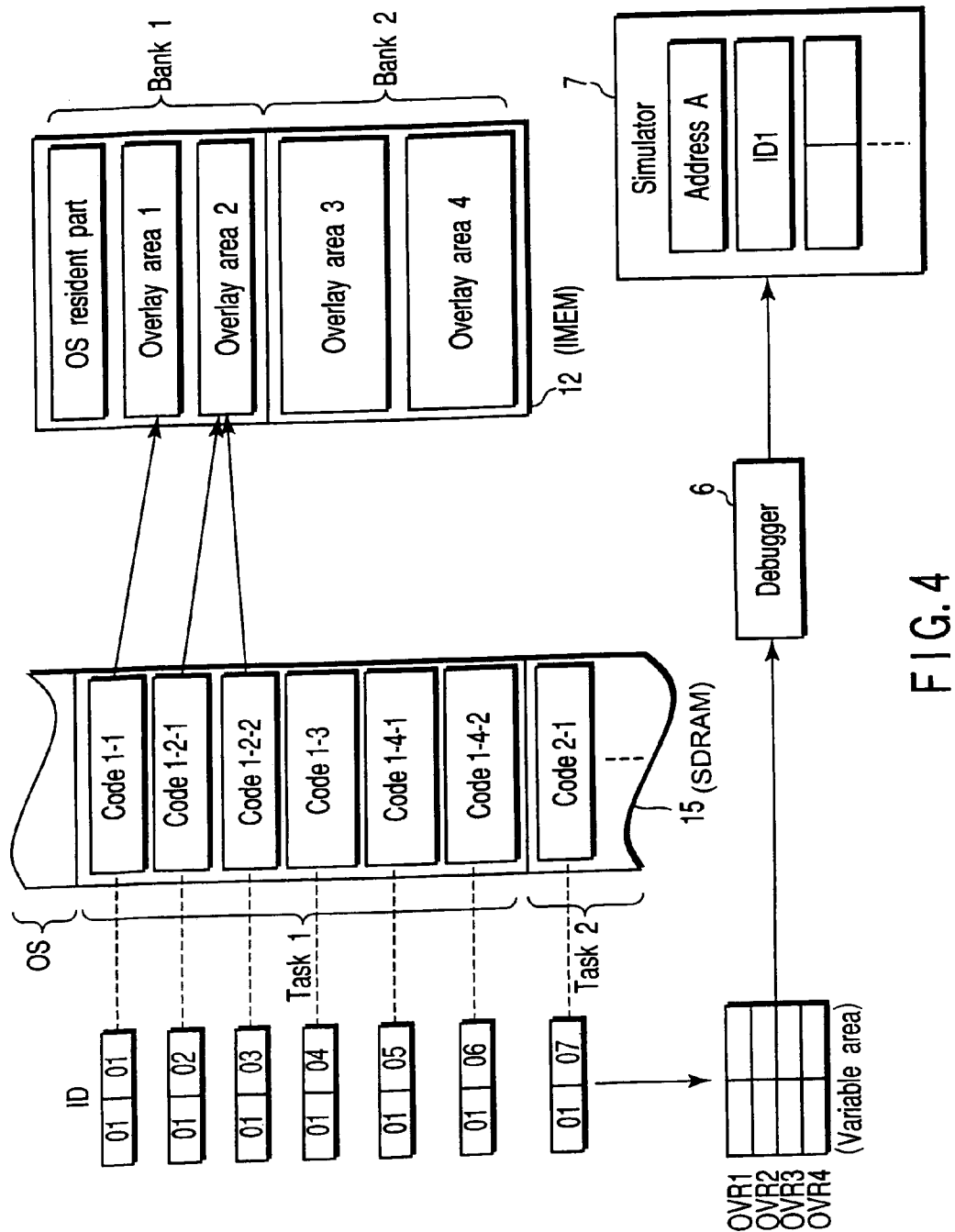
F I G. 4

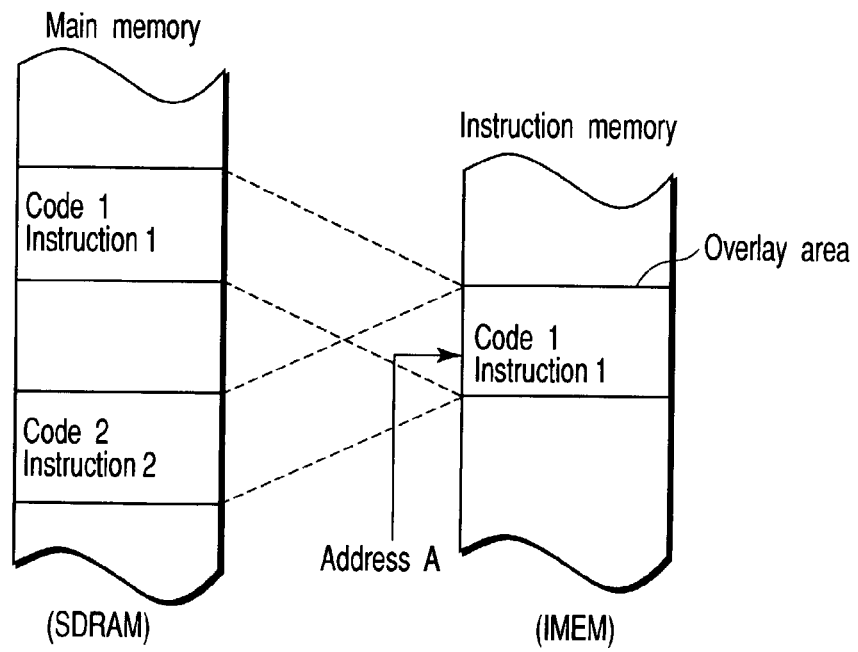
FIG. 12
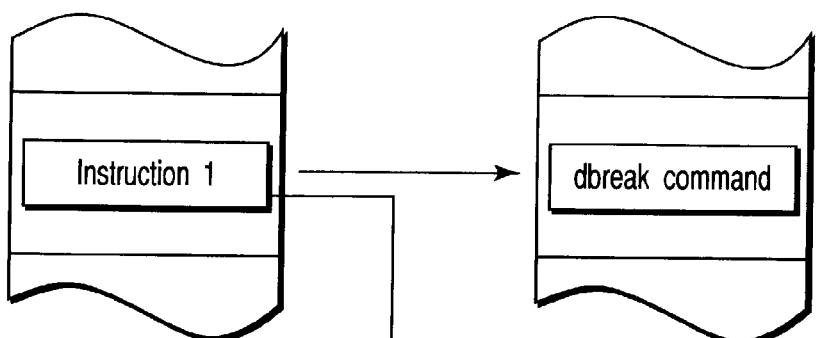
FIG. 13A
FIG. 13C
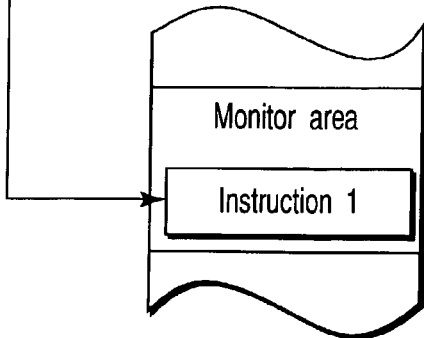
FIG. 13B

DEBUGGING APPARATUS AND METHOD

CROSS-REFERENCE TO RELATED APPLICATIONS

This application is based upon and claims the benefit of priority from the prior Japanese Patent Application No. 2002-152961, filed May 27, 2002, the entire contents of which are incorporated herein by reference.

BACKGROUND OF THE INVENTION

1. Field of the Invention

The present invention relates to a development environment used in design and development of, e.g., system LSIs and, more particularly, to a debugging apparatus and method used in a design/development environment of system LSIs.

2. Description of the Related Art

Some applications, such as multimedia applications, require real-time processes. To achieve real-time processes, overhead due to cache refill must be avoided. For this purpose, some processors used in multimedia applications incorporate an instruction memory (to be referred to as an IMEM hereinafter) in addition to an instruction cache.

As shown in FIG. 12, a main memory comprises, e.g., a synchronous DRAM (SDRAM). This main memory has a memory size as large as, e.g., about 256 Mbits. The IMEM is a simple RAM which has a size of about several ten K bits, and allows high-speed operation since an instruction can be fetched from the IMEM within one instruction cycle.

The main memory stores program codes (to be simply referred to as codes hereinafter) each consisting of a plurality of instructions. The plurality of codes in the main memory are transferred to an overlay area of the IMEM, and are executed from the IMEM. More specifically, the IMEM is a small-size memory, as described above. For this reason, it is difficult to store the entire program in the overlay area of the IMEM. Therefore, the program is divided into a plurality of codes, which are transferred to the overlay area and are executed according to execution of the program. Hence, a code stored in the overlay area is rewritten by the latest one every time the code is transferred.

For example, when codes 1 and 2 are stored in the main memory, and code 1 is to be executed, code 1 is copied to the overlay area of the IMEM. Upon execution of code 2, it is copied to the overlay area of the IMEM. Hence, code 2 is overlaid on code 1. Therefore, instruction 1 of code 1 or instruction 2 of code 2 may be set at address A of the IMEM depending on the timings. The contents of the IMEM are replaced by a plurality of different tasks or by an identical task.

Upon debugging a program, breakpoints are frequently used as debugging means. This is a method of suspending execution when execution is about to reach that address. However, when a plurality of codes are overlaid on the IMEM, a set break command is not executed or a break command is executed erroneously in some cases. Execution of a program includes execution by a simulator and that by a real device, and a break command does not function in various cases as follows.

(1) Upon execution by simulator

Normally, an execution address of a breakpoint is saved in an internal area of a simulator, and a break occurs when the value of a program counter (PC) matches the saved address of the breakpoint. However, a plurality of codes are replaced on the IMEM, as described above. For this reason, a wrong break may occur at an address other than that at which break in a program is to take place. For example, assume that a program is to break at the address of instruction 1 of code 1 in FIG. 12. In this case, the simulator saves address A (to be referred to as execution address of instruction 1). However, if code 2 is executed prior to code 1, instruction 1 at address A is replaced by instruction 2. Hence, debugging is broken at instruction 2 of code 2. That is, a wrong break occurs at a position not intended by the programmer.

(2) Upon execution by real device

Two different break means, i.e., hard break and soft break, are available for a real device. The operation of the hard break is similar to that of the simulator. That is, the execution address of a breakpoint is saved in hardware, e.g., an address break register. The program is broken when the value of a program counter (PC) matches the address saved in the address break register. In this case, a wrong break may occur as in the simulator.

On the other hand, FIGS. 13A to 13C show an example of the soft break. In case of the soft break, a break is simulated by, e.g., rewriting the program. For example, when the program is broken at instruction 1 shown in FIG. 13A, instruction 1 is saved in a debug monitor area, as shown in FIG. 13B, and a dbreak command (an instruction that generates a debug interrupt) is set in place of instruction 1, as shown in FIG. 13C. That is, the program is rewritten from instruction 1 to the dbreak command. After the dbreak command is executed, execution of subsequent instructions is halted, and the control is transferred to a debug handler or monitor. After that, the debug handler or monitor restores instruction 1 to the original address. However, when a plurality of codes are overlaid on the IMEM, the soft break cannot often be executed.

For example, a case will be examined wherein a program is to break at instruction 1 of code 1 stored in the IMEM, as shown in FIG. 14A. In this case, instruction 1 at address A on the IMEM is replaced by the dbreak command, as shown in FIG. 14B. However, when code 2 is overlaid on code 1, as shown in FIG. 14C, the dbreak command is replaced by instruction 2. After that, when code 1 is overlaid on code 2 again, as shown in FIG. 14D, the dbreak command is removed from address A. For this reason, when the output value of the program counter reaches address A, instruction 1 is executed, and no break occurs.

As described above, since the conventional debugger cannot break a program at an address intended by the programmer, and may cause a break at a wrong address, it is difficult to efficiently debug the program. For this reason, a demand has arisen for development of a debugging apparatus and method which can reliably break a program at an address to break the program and can prevent a break at a wrong address when program codes are overlaid, and can efficiently debug the program.

BRIEF SUMMARY OF THE INVENTION

According to an aspect of the invention, there is provided a debugging apparatus comprising: a first storage device configured to store a plurality of program codes identified by identifiers; a second storage device having at least one storage area, a program code to be executed of the plurality of program codes stored in the first storage device being stored in the storage area; a first variable storage area configured to store the identifier of the program code, which is stored in the storage area of the second storage device; and a controller configured to break execution of the program code when an identifier set in an input command matches the identifier stored in the first variable storage area at an address designated by the input command.

According to another aspect of the invention, there is provided a debugging method comprising: transferring a program code to be executed of a plurality of program codes to a storage area of a second storage device, the plurality of program codes being stored in a first storage device and identified by identifiers; comparing an output value of a program counter and an address set in an input break command; comparing, when the output value of the program counter matches the address set in the break command as a result of comparison, an identifier set by the break command and an identifier of the program code that has been transferred to the storage area of the second storage device; and breaking, when the identifiers match as a result of comparison of the identifiers, execution of the program code.

BRIEF DESCRIPTION OF THE SEVERAL VIEWS OF THE DRAWING

FIG. 4 is a block diagram showing details of the arrangement shown in FIGS. 1 and 2;

FIG. 12 is a view showing the operation of a conventional debugger;

FIGS. 13A to 13C are views showing an example of a conventional soft break; and

DETAILED DESCRIPTION OF THE INVENTION

Preferred embodiments of the present invention will be described hereinafter with reference to the accompanying drawings.

(First Embodiment)

Figure 1:
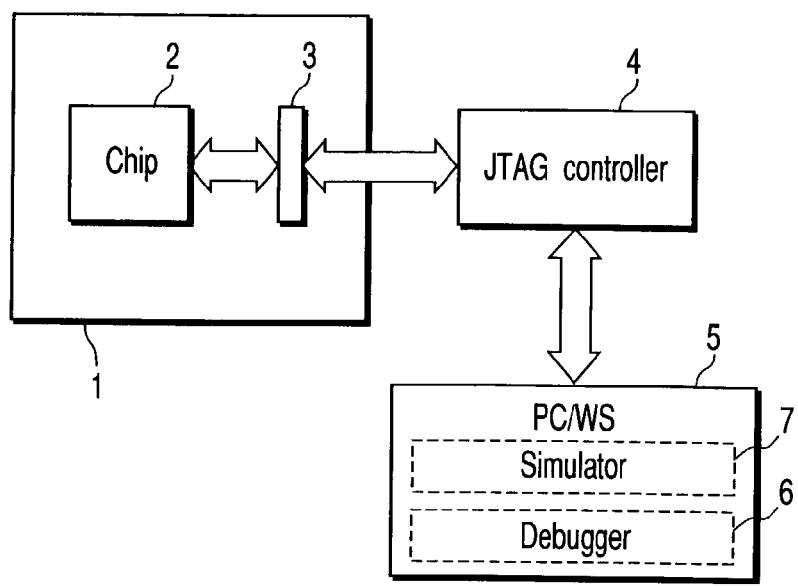
FIG. 1 is a block diagram showing an example of the arrangement of a debugging apparatus applied to the first embodiment of the present invention.

FIG. 1 shows an example of the overall arrangement of a debugging apparatus applied to the first embodiment. A chip 2 of a processor is mounted on a circuit board 1. This chip 2 is connected to a JTAG (Joint Test Action Group) controller 4 via a JTAG port 3. This JTAG controller 4 is connected to a personal computer (or workstation) 5. The personal computer 5 stores a debugger 6 for controlling to debug a program on the chip 2, and a simulator 7 for simulating the program.

Figure 2:
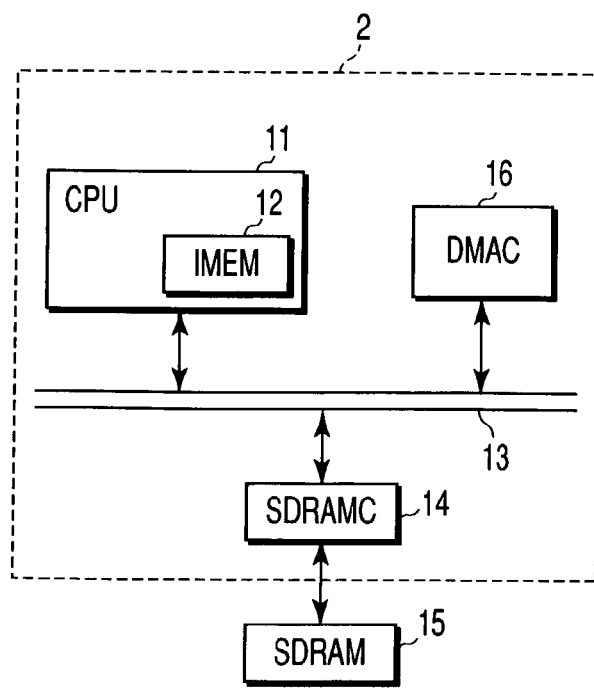
FIG. 2 is a partial block diagram of FIG. 1.

FIG. 2 shows a schematic arrangement of the processor arranged in the chip 2. A CPU 11 incorporates an IMEM 12 as an instruction memory. The CPU 11 is connected to a bus 13. An SDRAM 15 as a main memory is connected to the bus 13 via an SDRAMC (SDRAM controller) 14. The SDRAM 15 has a memory size as large as about 256 Mbits, and is arranged outside the chip 2. Furthermore, a DMAC (DMA controller) 16 that controls data transfer between the IMEM 12 and SDRAM 15 is connected to the bus 13. The IMEM 12 comprises a high-speed RAM from which an instruction can be fetched within, e.g., one instruction cycle, and which has a size of about several ten K bits.

Figure 3:
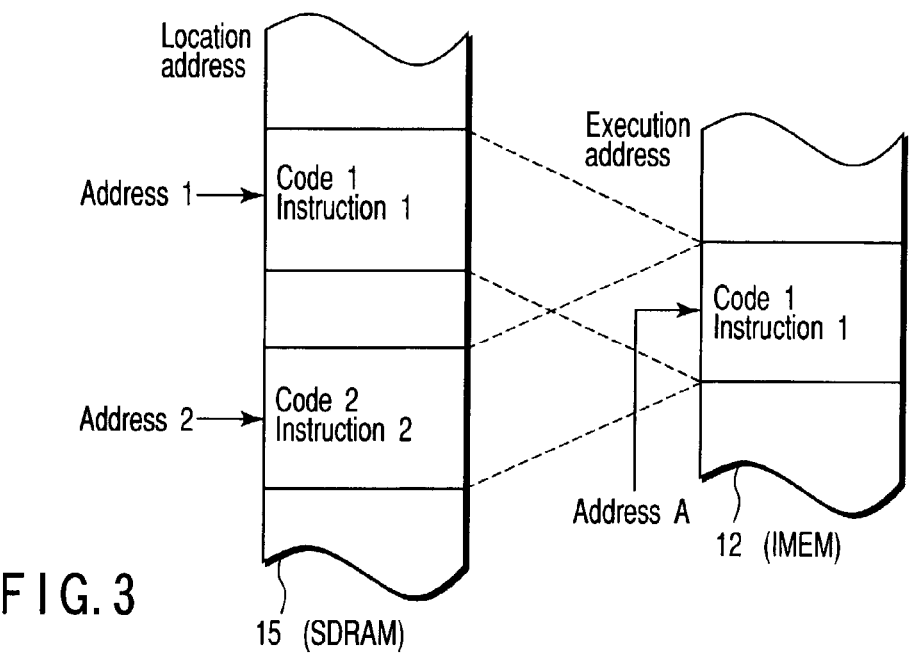
FIG. 3 is a view for explaining a code to be overlaid.

The detailed arrangement of FIGS. 1 and 2 will be explained below with reference to FIGS. 3 and 4. Note that the same reference numerals in FIGS. 3 and 4 denote the same parts as in FIGS. 1 and 2.

A code to be overlaid will be explained first using FIG. 3. In this embodiment, the code to be overlaid has two different addresses. As shown in FIG. 3, a code is set in a relatively low-speed memory (SDRAM in this embodiment) before it is executed. The address at that time is called a location address. In FIG. 3, address 1 indicates the location address. This code 1 is stored in the IMEM when it is executed. The address at that time is called an execution address of code 1. Address A shown in FIG. 3 is an example of the execution address of instruction 1 of code 1. In this embodiment, one code does not have a plurality of execution addresses. That is, assume that a given code is never stored in two or more execution addresses of the IMEM.

FIG. 4 shows details of the arrangement of FIGS. 1 and 2. The SDRAM 15 stores an OS (operating system) as a control program, and codes of a plurality of tasks 1, 2, and so on. On the other hand, the IMEM 12 is split into, e.g., two banks. Bank 1 stores a copy of the resident part of the OS. Furthermore, the IMEM 12 has, e.g., four overlay areas 1, 2, 3, and 4. The numbers of overlay areas and tasks may be arbitrarily set, and at least one overlay area may be assured. Overlay areas 1 and 2 are assured on bank 1, and overlay areas 3 and 4 are assured on bank 2. Codes of each task are replaced on each of these overlay areas.

The code of task 1 in the SDRAM 15 is divided into code 1-1, and codes 1-2-1 to 1-4-2. Each code is copied to the corresponding overlay area of the IMEM 12 before execution. That is, code 1-1 is copied to overlay area 1, and codes 1-2-1 and 1-2-2 are copied to overlay area 2. Also, code 1-3 is copied to overlay area 3, and codes 1-4-1 and 1-4-2 are copied to overlay area 4. That is, overlay area 2 is shared by codes 1-2-1 and 1-2-2, and overlay area 4 is shared by codes 1-4-1 and 1-4-2. The codes of each task are set in advance by, e.g., a programmer.

Each code has an ID serving as an identifier. This ID has, e.g., a 16-bit length: the first 8 bits record the identifier of a task, and the remaining 8 bits record a unique identifier in the task. For example, the ID of code 1-1 is 0x0101, and that of code 1-2-1 is 0x0102. The ID of each code is set by a language tool.

Also, variable storage areas OVR1, OVR2, OVR3, and OVR4 are assured in correspondence with the respective overlay areas. That is, variable storage areas OVR1, OVR2, OVR3, and OVR4 respectively correspond to overlay areas 1, 2, 3, and 4. Each of these variable storage areas OVR1, OVR2, OVR3, and OVR4 indicates a code and an overlay area which stores a copy of that code. For example, when code 1-1 is copied to overlay area 1, variable storage area OVR1 stores ID 0x0101 of code 1-1. These variable storage areas OVR1 to OVR4 can be looked up by all of the debugger, simulator, OS, and task. The IDs and the variable storage areas OVR1 to OVR4 are stored in, e.g., the SDRAM 15.

In this embodiment, variable storage areas OVR1, OVR2, OVR3, and OVR4 form the core of the operating system, and are updated by a kernel or task management program that resides on the IMEM 12. When the kernel switches a task from task 2 to task 1, it changes the contents of variable storage area OVR1 to 0x0101. After that, code 1-1 in the SDRAM 15 is copied to overlay area 1 of the IMEM 12. Task 1 then copies, e.g., code 1-3 to overlay area 3. In this case, the contents of variable storage area OVR3 are changed to 0x0104 first. After that, the DMAC 16 is activated to copy code 1-3 to overlay area 3. Overlay areas 1 and 3 are assured on different banks. For this reason, execution of code 1-1 and DMA transfer of code 1-3 are parallelly executed. Note that each code forms a section as a building unit of a program.

A method of setting a breakpoint will be explained below. A breakpoint is input from, e.g., a keyboard of the personal computer (or workstation) 5 after the debugger 6 is activated. More specifically, the breakpoint is set by a break command input from the keyboard.

Figure 5:
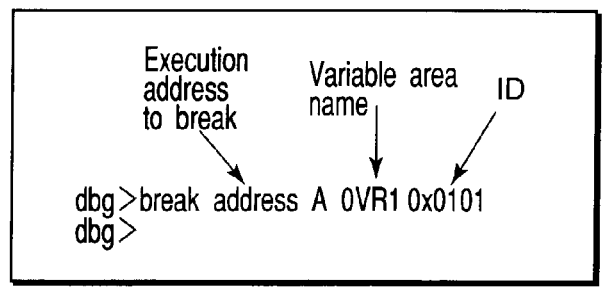
FIG. 5 shows an input format of a break command.

FIG. 5 shows the input format of the break command. In the break command shown in FIG. 5, the execution address to break a task, the variable storage area name indicating the overlay area, and the ID are designated after "dbg>break". In the example shown in FIG. 5, the execution address is address A, the variable storage area name is OVR1, and the ID is 0x0101. This description means that execution breaks when the output value of a program counter matches execution address A, and when a code specified by the ID is stored in overlay area 1 designated by the variable storage area name.

Figure 6:
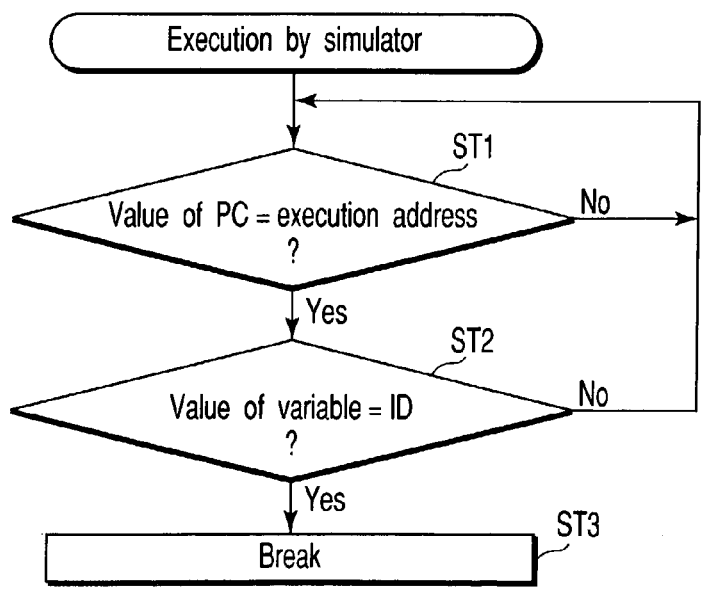
FIG. 6 is a flowchart showing the operation upon debugging by a simulator.

FIG. 6 shows the operation upon debugging by the simulator 7 shown in FIG. 4. When the simulator 7 executes instructions, the debugger 6 supplies the break condition (execution address, variable storage area name, and ID) to the simulator 7. The simulator 7 holds this break condition. The simulator compares the value of its program counter (PC) and the execution address while executing instructions (ST1). If they match, the simulator compares if the set variable storage area name matches an actual variable, and if the set ID matches an actual ID (ST2). That is, in the example shown in FIG. 5, the simulator compares if the value of variable storage area OVR1 is equal to the ID (0x0101) of code 1-1. If they match, the simulator breaks execution (ST3).

More specifically, if code 1 copied to the IMEM 12 is replaced by another code, the variable storage area name and ID set by the break command do not match the ID stored in one of variable storage areas OVR1 to OVR4. For this reason, no break occurs. Upon executing code 1, code 1 is copied from the SDRAM 15 to the IMEM 12. In this state, when the output value of the program counter matches address A of the breakpoint, the variable storage area name and ID set by the break command match the ID stored in one of variable storage areas OVR1 to OVR4. Therefore, a break reliably occurs at the set address.

Note that the debugger 6 or a kernel (not shown) may hold the variable storage area name and ID. Also, the simulator may directly look up variable storage areas OVR1 to OVR4.

In the above description, the value of the program counter (PC) is compared with the execution address, and if they match, it is compared if the set variable storage area name matches an actual variable, and if the set ID matches an actual ID. However, this order of comparison may be reversed. That is, it may be compared first if the set variable storage area name matches an actual variable, and if the set ID matches an actual ID, and if they match, the value of the program counter (PC) may be compared with the execution address.

The operation upon debugging by a real device will be explained below with reference to FIGS. 7 to 8B.

Figure 7:
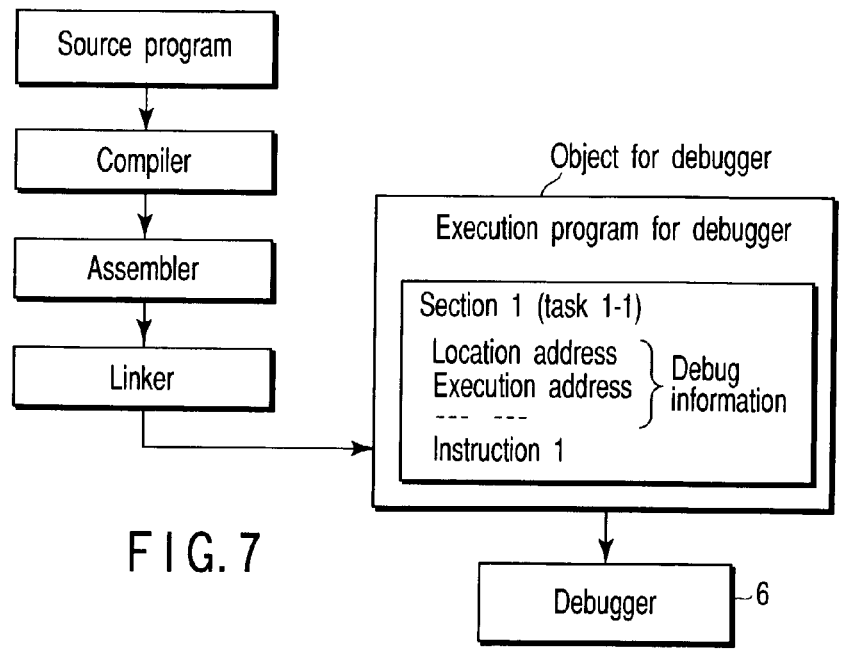
FIG. 7 is a view showing an object for a debugger in this embodiment.
Figure 8A:
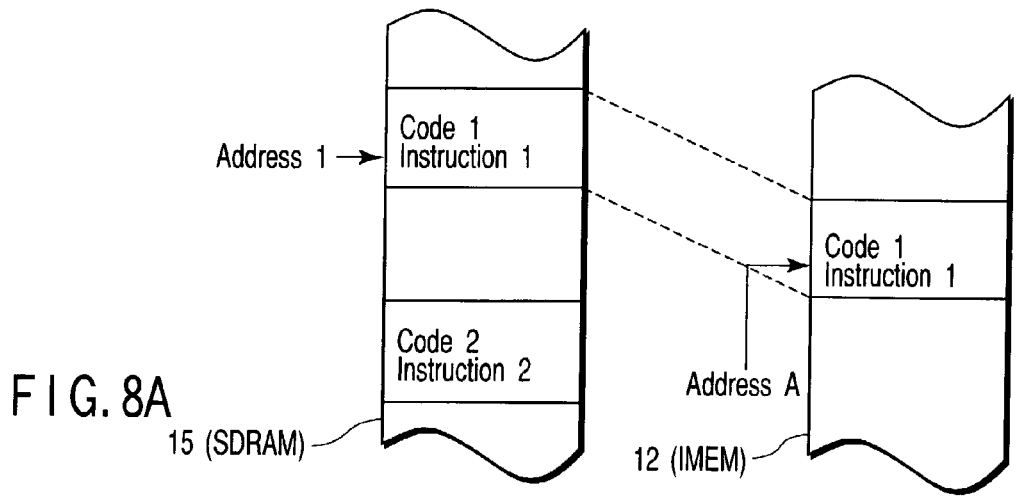
FIGS. 8A and 8B are views for explaining the operation upon debugging by a real device.

FIG. 7 shows an object for a debugger in this embodiment. As shown in FIG. 7, in an execution program for a debugger, each section (code) has, as debug information, the location address and execution address corresponding to the head of the section. The location address indicates the start address of the section when that section is stored in the SDRAM 15. The execution address indicates the start address of the section when that section is stored in the IMEM 12. When the user inputs the break condition shown in FIG. 5, instruction 1 stored at address A of the IMEM 12 shown in FIG. 8A is saved to a monitor area (not shown) of the debugger 6. That is, instruction 1 stored at address A of the IMEM 12 is saved to the monitor area (not shown) of the debugger 6 on the basis of the execution address to break the program of the break command.

Figure 8B:
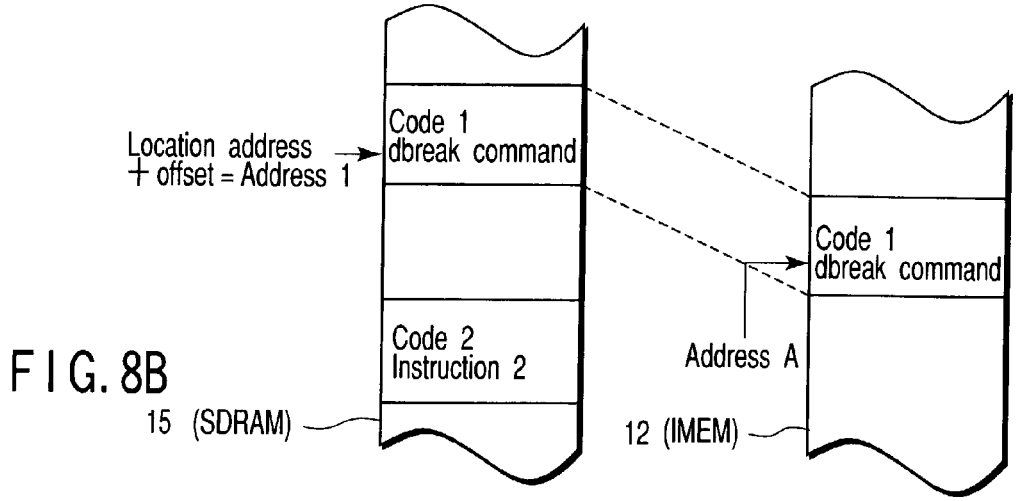

After that, a dbreak command as a break command is written at address A, as shown in FIG. 8B. At the same time, instruction 1 of code 1 stored in the SDRAM 15 is overwritten by the dbreak command.

The location address of instruction 1 on the SDRAM 15 is obtained as follows. The debugger acquires a debugger object of a code to which the execution address belongs, on the basis of the execution address of the break command. The location address of the head of the section is detected from this debugger object. By adding, to this location address, an offset (relative address) from the location address to instruction 1 in the section, address 1 on the SDRAM 15 can be obtained.

In this manner, the dbreak command is written at both the execution address on the IMEM 12 and the location address on the SDRAM 15. For this reason, even when code 1 on the IMEM 12 is replaced by another code, and the dbreak command is overwritten by another command, code 1 is copied again from the SDRAM 15 to the IMEM 12 upon executing code 1. As a result, the dbreak command is copied again onto the IMEM. Therefore, since the dbreak command never disappears from the IMEM 12, a break can reliably occur at address A.

According to the first embodiment, the ID is set for each code, and the code copied to each overlay area of the IMEM 12 is managed by the code ID stored in variable storage areas OVR1 to OVR4. Furthermore, the break command that sets a breakpoint has a variable storage area name and ID in correspondence with the execution address to break a program. Hence, upon debugging by the simulator, when a code copied to the IMEM 12 is replaced by another code, the variable storage area name and ID set in the break command do not match those in the variable storage area. Hence, no break occurs. On the other hand, when a code set in the break command is executed, the corresponding code is copied from the SDRAM 15 to the IMEM 12. At this time, the variable storage area name and ID in the variable storage area match those set in the break command. Hence, even when the codes are overlaid, a break can reliably occur at the set address.

Upon debugging by a real device, the break command is written at both the execution address of a code stored in the IMEM 12 and the location address of that code stored in the SDRAM 15. Hence, even when the code stored in the IMEM 12 is replaced by another code, the break command is never lost. Therefore, a break can reliably occur at the address where the break command is set.

Furthermore, the variable storage area has a plurality of areas. For this reason, even when a plurality of debug areas are set, a break can reliably occur at a desired address.

(Second Embodiment)

The second embodiment of the present invention will be described below.

In the first embodiment, the kernel and task update the contents of variable storage areas OVR1 to OVR4. By contrast, in the second embodiment, the DMAC (DMA controller) 16 updates the contents of variable storage areas OVR1 to OVR4. With this arrangement, the user need not consider updating of variable storage areas OVR1 to OVR4.

In this case, a method in which the hardware of the DMAC 16 updates the contents of variable storage areas OVR1 to OVR4 and a method in which a function of launching the DMAC 16 is provided, and the contents of variable storage areas OVR1 to OVR4 are updated by software using this function are available.

The simulator may be provided with a function of updating the contents of variable storage areas OVR1 to OVR4. However, in this case, execution cannot be broken by a real device.

According to the second embodiment, since the DMAC 16 updates the contents of variable storage areas OVR1 to OVR4, the user need not change variable storage areas OVR1 to OVR4 upon executing an overlay that he or she set. For this reason, the load on the user can be reduced.

(Third Embodiment)

Figure 9A:
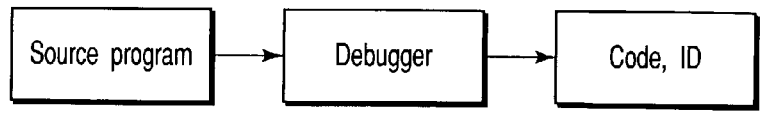
FIGS. 9A and 9B are views for explaining another example of a generation method of a code and ID according to the third embodiment of the present invention.
Figure 9B:
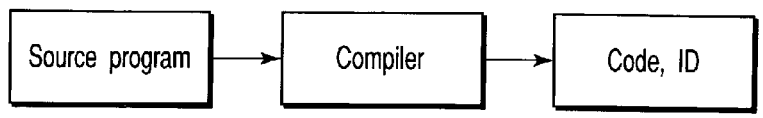

FIGS. 9A and 9B show the third embodiment of the present invention.

As shown in FIG. 9A, for example, a debugger may generate a table which has codes and IDs corresponding to the codes on the basis of a source program. With this arrangement, the user need only input a break command, and the load on the user can be further reduced.

Also, as shown in FIG. 9B, for example, a compiler may generate a table which has codes and IDs corresponding to the codes on the basis of a source program. With this arrangement as well, the user need only input a break command, and the load on the user can be further reduced.

(Fourth Embodiment)

In the first to third embodiments, the break command is input from the keyboard. However, the present invention is not limited to this.

Figure 10:
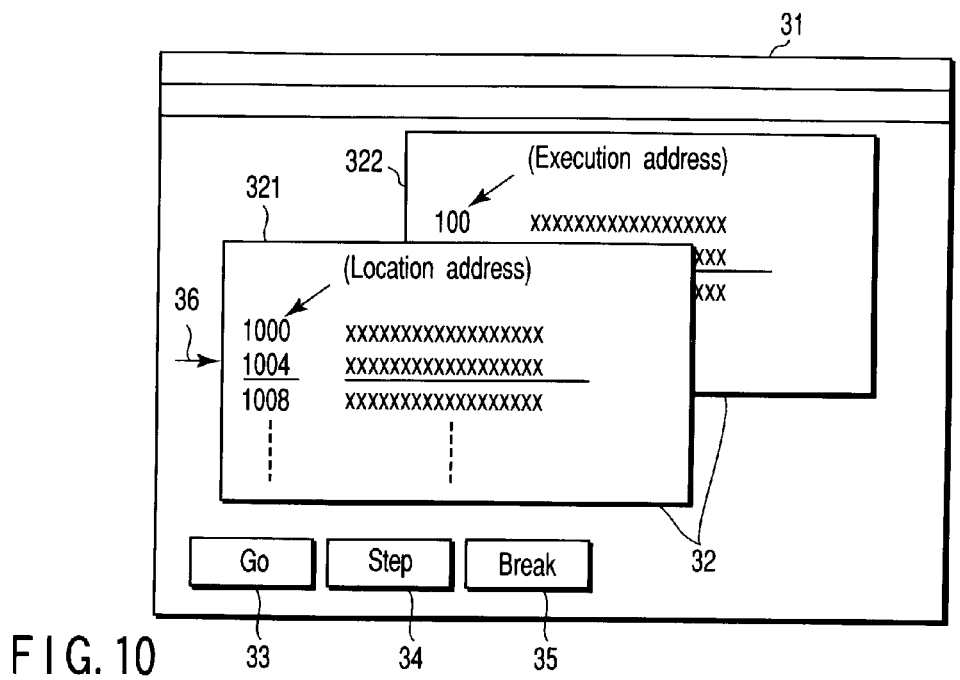
FIG. 10 is a view showing an example in which a break command is input using a GUI according to the fourth embodiment of the present invention.

FIG. 10 shows an example in which the break command is input using a GUI (Graphical User Interface) according to the fourth embodiment of the present invention. For example, a source window 32 of the debugger 6 is displayed on a display 31 of the personal computer or workstation. This source window 32 displays a source program described in C or assembler. This source program is formed by the location or execution addresses, and instructions. Whether the location or execution addresses are to be displayed can be arbitrarily set by the user.

A source program which displays the location addresses and that which displays the execution addresses can be displayed on independent windows. For example, a window 321 shown in FIG. 10 displays a source program including location addresses, and a window 322 displays a source program including execution addresses. Furthermore, either of the windows 321 and 322 can be displayed, or both the windows 321 and 322 can be simultaneously displayed. Also, an overlay area, the source program of which is to be displayed, can be selected.

A plurality of icons 33, 34, and 35 used to instruct operations of the debugger 6 are displayed near the source window 32. Of these icons, the icon 35 is used to instruct generation of a break command.

Figure 11:
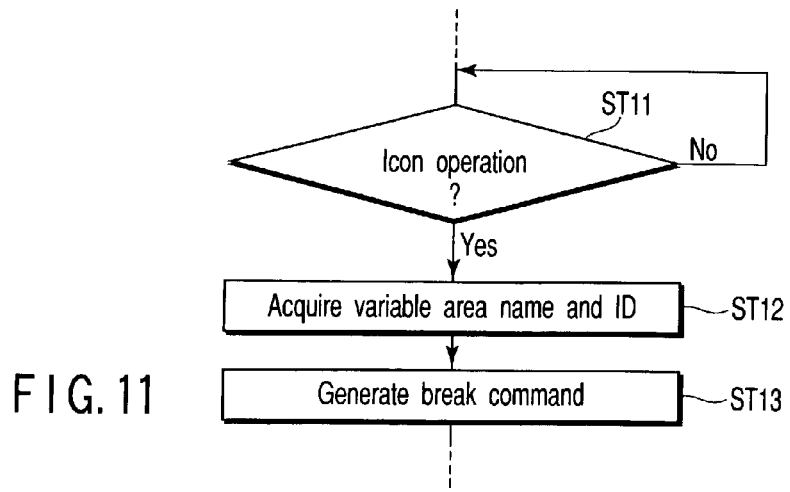
FIG. 11 is a flowchart showing the operation of FIG. 10.
Figure 14A:
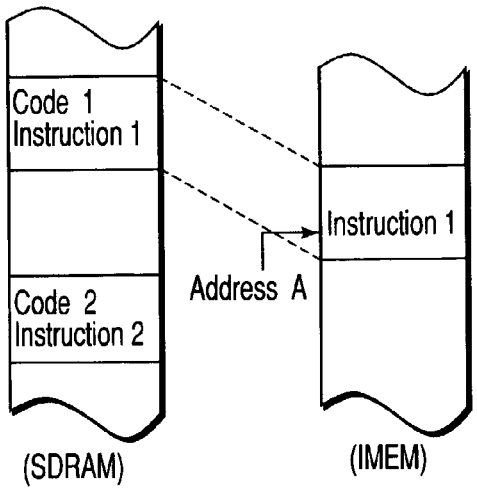
FIGS. 14A to 14D are views showing the operation of a conventional debugger.
Figure 14B:
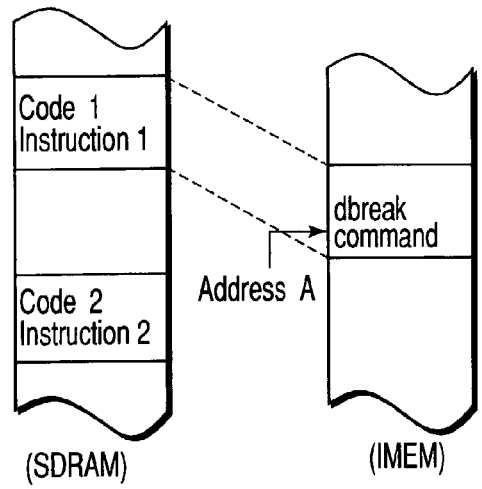
Figure 14C:
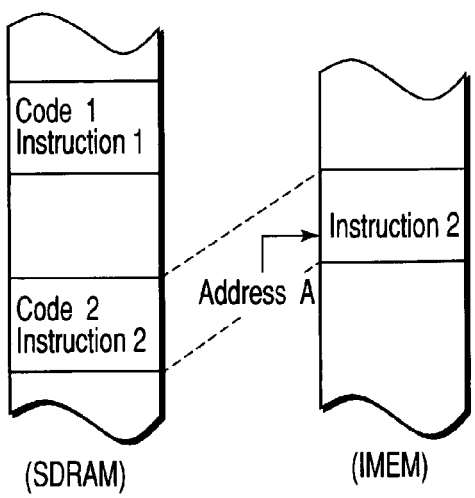
Figure 14D:
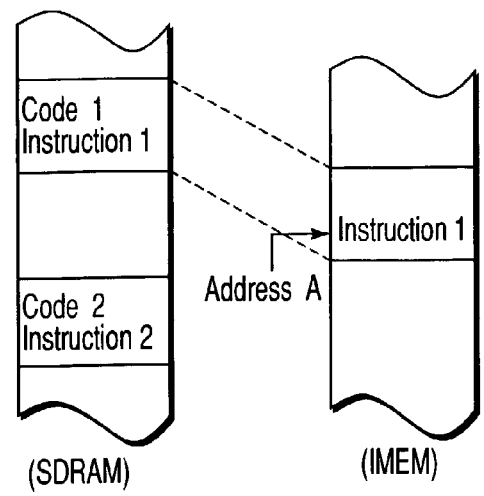

FIG. 11 shows a schematic operation of the debugger 6. In the display state shown in FIG. 10, if the user moves a cursor 36 to a desired line of the source program displayed on the source window 321 or 322, and clicks the icon 35 (ST11), a break command shown in FIG. 5 is automatically generated. More specifically, the debugger 6 obtains the execution address, variable storage area name, and ID from debug information of the debugger execution program shown in FIG. 7 (ST12), and generates the break command based on them (ST13). At this time, if the source window displays the location addresses, the execution address is acquired from the debug information, and is set in the break command. Note that this embodiment is not limited to generation of the break command itself, but information corresponding to the break command may be generated.

According to the fourth embodiment, the user need only move the cursor to a desired line of the source program displayed on the display 31, and click the icon 35 used to generate a break command. Therefore, since the user need not recognize the variable storage area name and ID, the operability can be further improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A debugging apparatus comprising:
    a first storage device configured to store a plurality of program codes identified by identifiers;
    a second storage device having at least one storage area, a program code to be executed of the plurality of program codes stored in said first storage device being stored in the storage area;
    a first variable storage area configured to store the identifier of the program code, which is stored in the storage area of said second storage device, wherein the first variable storage area stores the identifier in accordance with a variable storage area name; and
    a controller configured to break execution of the program code when an identifier and a variable storage area name set in an input command match the identifier stored in said first variable storage area and the variable storage area name at an address designated by the input command.

2. The apparatus according to claim 1, wherein the plurality of program codes are included in a task constituted by at least one program code, and the identifier includes an identifier of the task, and an identifier of the program code in the task.

3. The apparatus according to claim 1, further including a second variable storage area configured to store an identifier corresponding to each program code.

4. The apparatus according to claim 1, wherein the identifier stored in the first variable storage area is updated by a kernel of a control program.

5. The apparatus according to claim 1, wherein the identifier stored in the first variable storage area is updated by a task management program of a control program.

6. The apparatus according to claim 1, further comprising a DMA controller configured to transfer the program code stored in said first storage device to said second storage device.

7. The apparatus according to claim 6, wherein the identifier stored in the first variable storage area is updated in correspondence with transfer of the program code by said DMA controller.

8. The apparatus according to claim 1, wherein the identifier stored in the first variable storage area is updated by a debugger which debugs the program code.

9. The apparatus according to claim 1, wherein the identifier stored in the first variable storage area is directly looked up by a simulator which simulates execution of the program code.

10. A debugging method comprising:
transferring a program code to be executed of a plurality of program codes to a storage area of a second storage device, said plurality of program codes being stored in a first storage device and identified by identifiers, wherein the identifier of the program code to be transferred to the storage area of the second storage device is stored in a first variable storage area in accordance with a variable storage area name;
comparing an output value of a program counter and an address set in an input break command;
comparing, when the output value of the program counter matches the address set in the break command as a result of comparison, an identifier and a variable storage area name set by the break command and the identifier stored in the first variable storage area and the variable storage area name; and
breaking, when the identifiers and the variable storage area names match as a result of comparison of the identifiers and the variable storage area names, execution of the program code.

11. The method according to claim 10, wherein the identifiers are set for the program codes stored in the first storage device before the program code is transferred from the first storage device to the second storage device.

12. The method according to claim 10, wherein the identifier stored in the first variable storage area is updated by a kernel of a control program.

13. The method according to claim 10, wherein the identifier stored in the first variable storage area is updated by a task management program of a control program.

14. The method according to claim 10, wherein the identifier stored in the first variable storage area is updated in correspondence with transfer of a program code by a DMA controller.

15. The method according to claim 10, wherein a debugger generates the program codes and identifiers corresponding to the program codes on the basis of a source program.

16. The method according to claim 10, wherein a compiler generates the program codes and identifiers corresponding to the program codes on the basis of a source program.

17. The method according to claim 10, further comprising:
displaying a source program and an icon used to instruct generation of a break command on a display before the output value of the program counter is compared with the address set in the input break command; and
generating the break command or information corresponding to the break command on the basis of an address and the identifier corresponding to a designated portion of the source program displayed on the display in response to an operation of the icon.

18. The method according to claim 17, further comprising simultaneously displaying a first window which displays a source program including location addresses and a second window which displays a source program including execution addresses.

19. A debugging method comprising:
copying a program code to be executed of a plurality of program codes to a storage area of a second storage device, said plurality of program codes being stored in a first storage device and identified by identifiers, the program code in the storage area having an execution address and a start address which indicates a head of the program code when the program code is stored in the first storage device;
writing a break command at a first address of the program code that has been transferred to the storage area; and
writing the break command at a second address corresponding to the first address of the program code which remains in the first storage device.

20. The method according to claim 19, wherein the second address is obtained by adding the first address to the start address.

21. The method according to claim 19, wherein the start address corresponding to the head of the program code and the execution address are supplied to a debugger.

22. The method according to claim 19, wherein the identifiers are set for the program codes stored in the first storage device before the program code is transferred from the first storage device to the second storage device.

23. The method according to claim 19, wherein the identifier of the program code to be transferred to the storage area of the second storage device is stored in a first variable storage area.

24. The method according to claim 23, wherein the identifier stored in the first variable storage area is updated by a kernel of a control program.

25. The method according to claim 23, wherein the identifier stored in the first variable storage area is updated by a task management program of a control program.

26. The method according to claim 23, wherein the identifier stored in the first variable storage area is updated in correspondence with transfer of a program code by a DMA controller.

27. The method according to claim 19, wherein a debugger generates the program codes and identifiers corresponding to the program codes on the basis of a source program.

28. The method according to claim 19, wherein a compiler generates the program codes and identifiers corresponding to the program codes on the basis of a source program.

29. The method according to claim 19, further comprising:
displaying a source program and an icon used to instruct generation of a break command on a display before an output value of a program counter is compared with an address set in an input break command; and
generating the break command or information corresponding to the break command on the basis of an address and the identifier corresponding to a designated portion of the source program displayed on the display in response to an operation of the icon.

30. The method according to claim 29, further comprising simultaneously displaying a first window which displays a source program including location addresses and a second window which displays a source program including execution addresses.

* * * * *